United States Patent
Watanabe et al.

[11] Patent Number: 5,818,640
[45] Date of Patent: Oct. 6, 1998

[54] SIGN ILLUMINATION SYSTEM AND METHOD

[75] Inventors: Yoshio Watanabe, Kamakura; Toshitaka Nakajima, Nishimurayama-gun; Muneo Momozawa, Takarazuka; Satoshi Kakishita, Ashiya, all of Japan

[73] Assignee: Minnesota Mining and Manufacturing Company, St. Paul, Minn.

[21] Appl. No.: 776,233

[22] PCT Filed: Jul. 27, 1995

[86] PCT No.: PCT/US95/09532

§ 371 Date: Jan. 30, 1997

§ 102(e) Date: Jan. 30, 1997

[87] PCT Pub. No.: WO96/04638

PCT Pub. Date: Feb. 15, 1996

[30] Foreign Application Priority Data

Aug. 1, 1994 [JP] Japan .................................. 6-179930

[51] Int. Cl.$^6$ ........................................ G02B 5/12
[52] U.S. Cl. .................... 359/515; 359/527; 359/532; 359/547; 359/552; 404/9; 116/63 R
[58] Field of Search ..................... 359/515, 527, 359/528–532, 547, 551, 552, 534, 536, 542; 116/63 R, 63 P, 63 C, 63 T; 404/9–10

[56] References Cited

U.S. PATENT DOCUMENTS

| 2,326,634 | 8/1943 | Gebhard et al. |
| 3,712,706 | 1/1973 | Stamm. |
| 4,505,967 | 3/1985 | Bailey ..................................... 428/164 |
| 4,726,134 | 2/1988 | Woltman ................................... 40/582 |
| 4,957,335 | 9/1990 | Kuney, Jr. |

FOREIGN PATENT DOCUMENTS

| 0 326 186 | 8/1989 | European Pat. Off. ........ G02B 5/128 |
| 91 05 945.3 | 8/1991 | Germany ......................... G09F 13/42 |
| 94 01 987.8 | 4/1994 | Germany ......................... G09F 13/16 |
| 6-069426 | 4/1994 | Japan ............................. G02B 5/126 |

OTHER PUBLICATIONS

Proceedings of the 49th Annual Conference of the Japan Society of Civil Engineers VI–102 (Sep., 1994) w/translation.

*Primary Examiner*—James Phan
*Attorney, Agent, or Firm*—Peter L. Olson

[57] ABSTRACT

This relates to a system for and method of illuminating a sign, so that drivers and observers may easily recognize and read the sign and billboard. The apparatus employs an external illumination source that is easy to inspect and maintain. The illumination source and the sign or billboard are separately installed from each other. Light emitted from the illumination source forms an incident angle (θ) in the range of 0° to about 30° at any point on the road sign. A road sign area of the sign is made of a retroreflective sheet having a wide observation angle.

11 Claims, 6 Drawing Sheets

SIGN ILLUMINATION SYSTEM AND METHOD

FIELD OF INVENTION

The present invention relates to a system for and a method of illuminating a sign, particularly road signs, billboards, bicycle riding path signs, walking path signs, and the like.

BACKGROUND

Retroreflective road signs presently employed for road signs are often installed at a relatively high position above the roadway and typically do not have a wide observation angle. Motor vehicles typically run with their headlights directed downward, i.e., low beams, particularly when in areas having large volumes of traffic, such that the quantity of light emitted from the headlights toward a sign is often relatively small. As a result, drivers may have trouble in recognizing and reading the road sign. In urban areas there are typically many street lights, building illuminations, and neon lights that interfere with the ability of drivers to see and read road signs. To improve the ability of drivers to recognize and read road signs, the road signs are often provided with an illumination source.

FIGS. 5 and 6 show examples of conventional illumination systems for road signs. In FIG. 5, sign 10 is illuminated by illumination source 20, e.g., a lamp (usually, a fluorescent lamp), both sign 10 and illumination source 20 being mounted on pole 30. Illumination source 20 illuminates sign 10 from above. In FIG. 6, illumination source 20 illuminates road sign 10 from below, both sign 10 and illumination source 20 being mounted on pole 30. These illumination sources and methods of illuminating the road sign are based on JIS and the Japan Road Sign Installation Standards Act.

U.S. Pat. No. 4,726,134 (Woltman) discloses an improved roadway sign in which the retroreflective properties of the indicia and background portions of a sign face are separately selected to optimize the conspicuity of the sign at relatively longer distances and legibility of the sign at relatively shorter distances. U.S. Pat. No. 4,957,335 (Kuney) discloses selection of microspheres in microsphere-based retroreflective articles to optimize retroreflective brightness at narrow observation angles. Japanese Application No. 6-9426/94 (Nakajima), filed Apr. 7, 1994, discloses a microsphere-based retroreflective sheeting comprising two classes of microspheres intended to impart good retroreflective performance at both narrow observation angles and wide observation angles.

The need exists for better systems of sign illumination.

SUMMARY OF INVENTION

The present invention provides an illuminated sign system and a method for illuminating a sign. It is particularly well suited for road signs, billboards, bicycle riding path signs, walking path signs, and the like.

In brief summary, the illuminated sign system of the invention comprises a sign having a retroreflective sign face and an illumination source. The illumination source is positioned relative to the sign face such that it emits light that is incident to the sign face at an incidence angle in the range of about 0° to about 30°. The sign face comprises retroreflective portions which have a wide effective incidence angle and wide effective observation angle. A glossary of some of the terms used to define the geometry of retroreflection is provided at the end of this specification.

Briefly summarizing, the method of the invention comprises providing a sign having a face that comprises a retroreflective portion, providing an illumination source, positioning the illumination source relative to the sign face such that light emitted from the illumination source is incident to the sign face at an incidence angle of between about 0° and 30°. The retroreflective portions of the sign face exhibit wide effective incidence and observation angles. The illumination source then illuminates the sign face, rendering it more easily read and understood while not blocking the view of observers. Preferably the retroreflective portions, and positioning of the illumination source are such that substantially no portion of the sign face is blocked from view by an observer in the intended observation zone by the illumination source.

The retroreflective sheet efficiently reflects the light toward observers, e.g., drivers and pedestrians, so that they may easily recognize and read the sign. The illumination source may be installed on the shoulder of a road, so that it can be conveniently and safely maintained without interfering with traffic flow. The retroreflective sheet preferably has a wide effective incidence angle and wide effective observation angle. Accordingly, in embodiments such as billboards, observers in motor vehicles and on foot as pedestrians may easily see it. As a result, the billboard achieves a good advertising effect.

BRIEF DESCRIPTION OF THE DRAWINGS

The invention will be further explained with reference to the drawing, wherein like components are denoted with like numbers and.

These figures, which are idealized and are not to scale, are intended to be merely illustrative and non-limiting.

DETAILED DESCRIPTION OF ILLUSTRATIVE EMBODIMENTS

In order for light from the illumination source to be reflected by the sign so as to be visible to a driver, thereby rendering the sign more visible and easily read, the sign should reflect the light at a relatively higher observation angle than is typically provided in retroreflective materials which are optimized to reflect light from vehicle headlights so as to be visible to a driver of the vehicle. When discussing retroreflective articles, typically the light reflected by the article is spread into a cone of light directed back toward the origin of the light. In signs of the present invention, the retroreflective material is selected to provide a somewhat wider cone than is used in other applications. For example, a typical narrow observation angle sheet might provide retroreflective brightnesses (in candelas/lux/meter$^2$) of 335, 7.1, 1.4, 0.2, and 0.1, at observation angles of 0.2°, 2°, 5°, 15°, and 20°, respectively, while a sheeting have a wide effective observation angle might provide retroreflective brightnesses of 140, 3.8, 1.2, 0.6, and 1.1, respectively.

Figure 5:
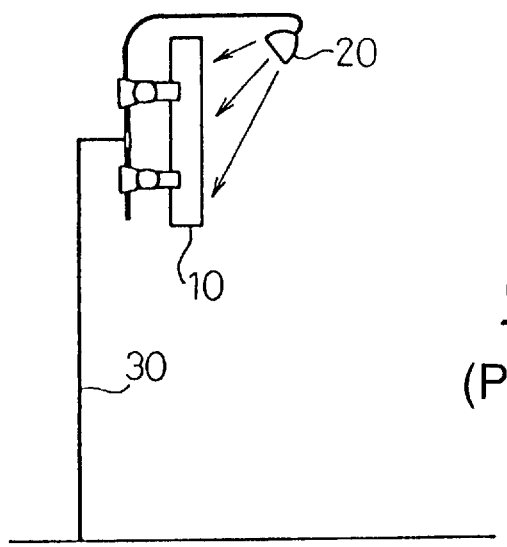
FIG. 5 illustrates an example of an external illumination source for illuminating a road sign according to a prior art.
Figure 6:
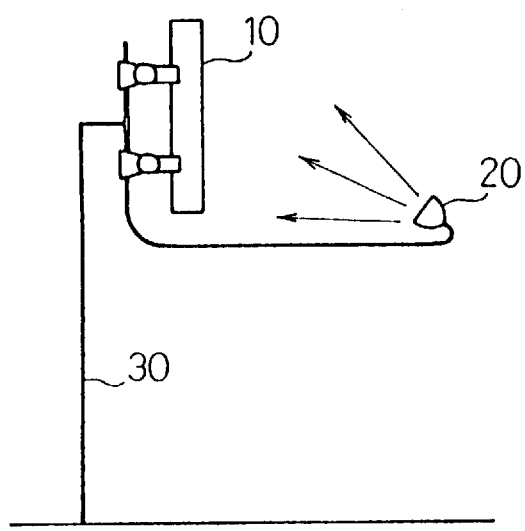
FIG. 6 illustrates another example of an external illumination source for illuminating a road sign according to a prior art.

FIGS. 5 and 6 show examples of conventional illumination systems for a road sign. In FIG. 5, sign 10 is illuminated by illumination source 20, e.g., a lamp (usually, a fluorescent lamp), both sign 10 and illumination source 20 being mounted on pole 30. Illumination source 20 illuminates sign 10 from above. In FIG. 6, illumination source 20 illuminates road sign 10 from below, both sign 10 and illumination source 20 being mounted on pole 30. These illumination sources and methods of illuminating the road sign are based on JIS and the Japan Road Sign Installation Standards Act.

The face of conventional signs as shown in FIG. 5 and 6 do not have wide effective observation angles because they are optimized to reflect light from vehicle headlights so as to be visible to a driver of the vehicle. As a result, only small quantities of the light emitted by the illumination source is reflected by the sign toward the driver; instead much of it is retroreflected by the sign generally back toward the illumination source if within the effective entrance angularity of the material or diffusely reflected to minimal benefit. In addition, in the system shown in FIG. 6 where the road sign 10 is illuminated from below, illumination source 20 can block the visibility of the sign to a driver from certain angles.

In cases where the sign is mounted over the highway such as is commonly used on freeway signs, the systems shown in FIGS. 5 and 6 may require blocking or diverting traffic in order for work crews to gain access to the signs to inspect and maintain the illumination sources.

An advantage of the present invention is the sign may be easily recognized and read. Another advantage is that the illumination source can be disposed such that it can be easily inspected and maintained without creating traffic blockages. In addition to being used as roadway signs, the illuminated sign system of the invention can be used to advantageous effect to provide a billboard to be easily recognized by observers or pedestrians and to provide signs for bicycle riding paths, walking paths, and the like.

In accordance with the invention, the illumination source is disposed relative to the sign quite differently than was done previously. In some embodiments the illumination source can be separately installed from the sign at some distance away. The illumination source is positioned relative to the sign so as to emit light that forms an incident angle or entrance in the range of 0° to about 30° at any point on the face of the sign. In some embodiments, the incident angle (θ) of emitted light to the sign face may be in the range of 0° to about 15°. The face of the sign comprises portions that are retroreflective and which exhibit wide effective observation angles. As a result, a substantial portion of the light emitted from the illumination source will be reflected by the sign so as to be visible to intended observers, e.g., drivers and passengers of motor vehicles.

In the case of a sign suspended over one or more lanes of the roadway, the complementary illumination source can be installed on the outside portions of the sign nearer the edge of the road way, or preferably on the shoulder of a road. The present invention makes possible such positioning of the illumination source which in turn makes possible inspection and,maintenance of the illumination source while minimizing disruption of traffic flow.

In a preferred embodiment, the illumination source comprises a floodlight having a mask such that the source substantially illuminate only the face of the road sign. As a result, light emitted by the source does not bother drivers in vehicles traveling in other lanes, e.g., lanes of traffic traveling in the opposite direction.

In a preferred embodiment, the height H of the floodlight of the illumination source above ground level is expressed as follows:

$$(100-L)X/100 < H < (X+Y)(300-L)/300$$

where L is a horizontal distance between the illumination source and the road sign (and is less than about 100 meters, preferably less than or equal to about 50 meters, and more preferably between about 20 and about 40 meters), X is the height of the bottom of the sign face above ground level, and Y is the height of the sign face itself.

Upon reading this specification, suitable retroreflective materials for use on the sign face can be readily selected by those of ordinary skill in the art. Illustrative examples include encapsulated-lens type retroreflective materials, exposed-lens type retroreflective materials, or embedded-lens type retroreflective materials. Suitable materials are available commercially in sheeting form (flexible or relatively rigid) and may also be formed as paints or coatings if desired. The aforementioned U.S. Pat. No. 4,726,134 (Woltman), U.S. Pat. No. 4,957,335 (Kuney), and Japanese Application No. 6-69426/94 (Nakajima), each disclose teachings that enable one skilled in the art to select suitable retroreflective materials for use in the invention. Also, U.S. Pat. No. 4,505,967, (Bailey) discloses a retroreflective sheeting capable of good retroreflective performance at high entrance angles that is well suited for use in the present invention.

Preferably retroreflective materials used in the invention retain at least 20 percent, more preferably at least 40 percent, of their 0.2° observation angle brightness at a 10° observation angle. It will be understood that other retroreflective materials can be used to advantageous effect in accordance with this invention.

Figure 1:
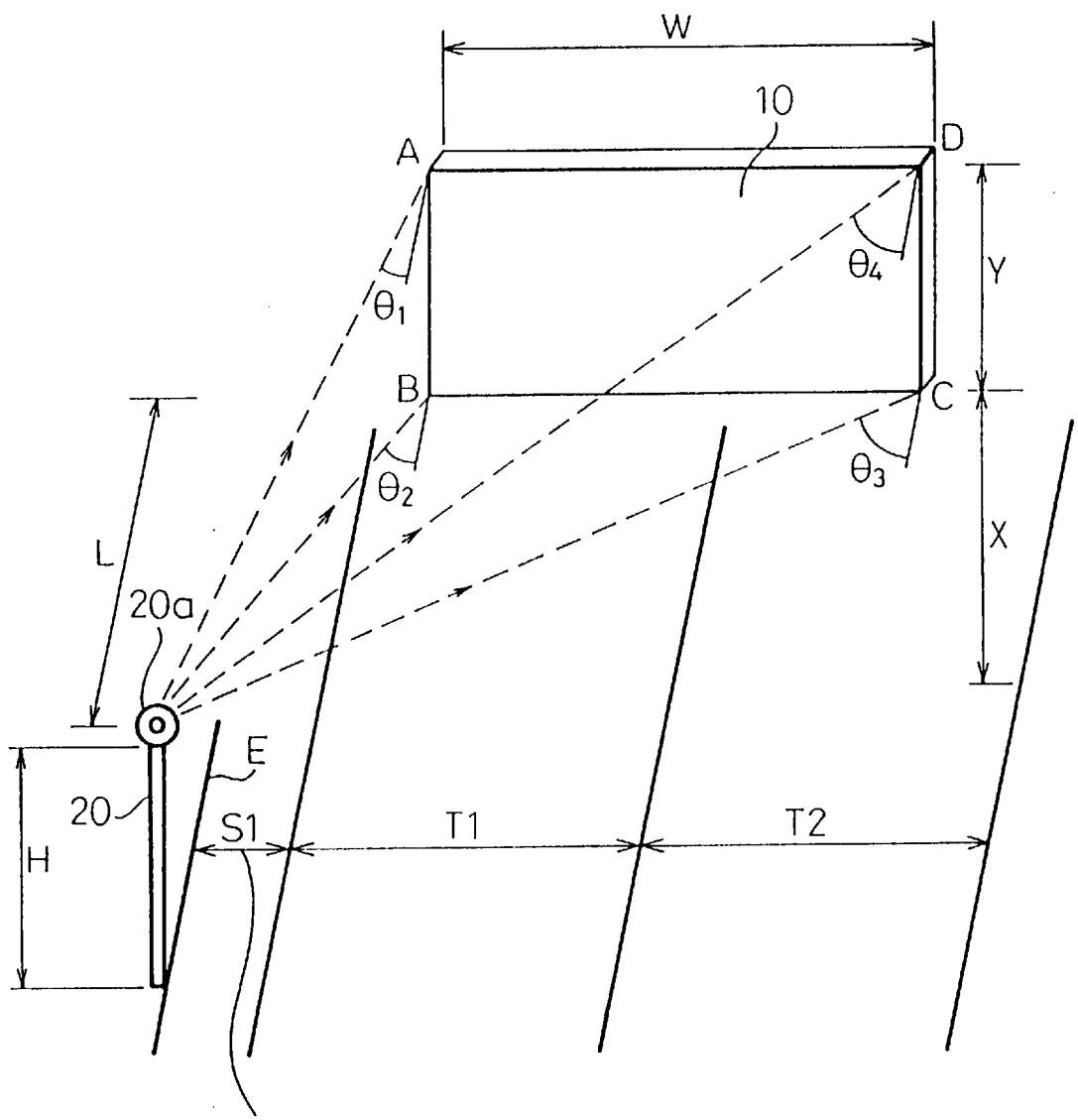
FIG. 1 illustrates a typical illuminated sign system of the invention along a freeway.

FIG. 1 shows a preferred embodiment of the present invention installed for a typical freeway. The figure shows first and second lanes T1 and T2, side way S1 (e.g., a break down lane), road shoulder E, and sign 10 having a face with width W. The sign face bears a retroreflective sheet having a wide observation angle such as described above. Illumination source 20 is preferably installed on the shoulder of the road, comprising floodlight 20a fitted to the top of illumination source 20 from which light is emitted. X is the height of a lower edge of the sign face above ground level, Y is the height of the sign face itself. L is the horizontal distance between illumination source 20 and road sign 10, and H is the height of floodlight 20a of illumination source 20 above ground level.

Dotted lines indicate paths of light emitted from floodlight 20a toward road sign 10. The light paths form incident angles θ1, θ2, θ3 to θ4 at vertexes A, B, C and D of road sign 10. Road sign 10 preferably is positioned so as to be substantially orthogonal to lanes T1 and T2.

Illumination source 20 is arranged so that incident angle θi (i=1 to 4) of light emitted from the illumination source 20 toward road sign 10 satisfies the following:

$$0° < θi < 30° \qquad (I)$$

Figure 2:
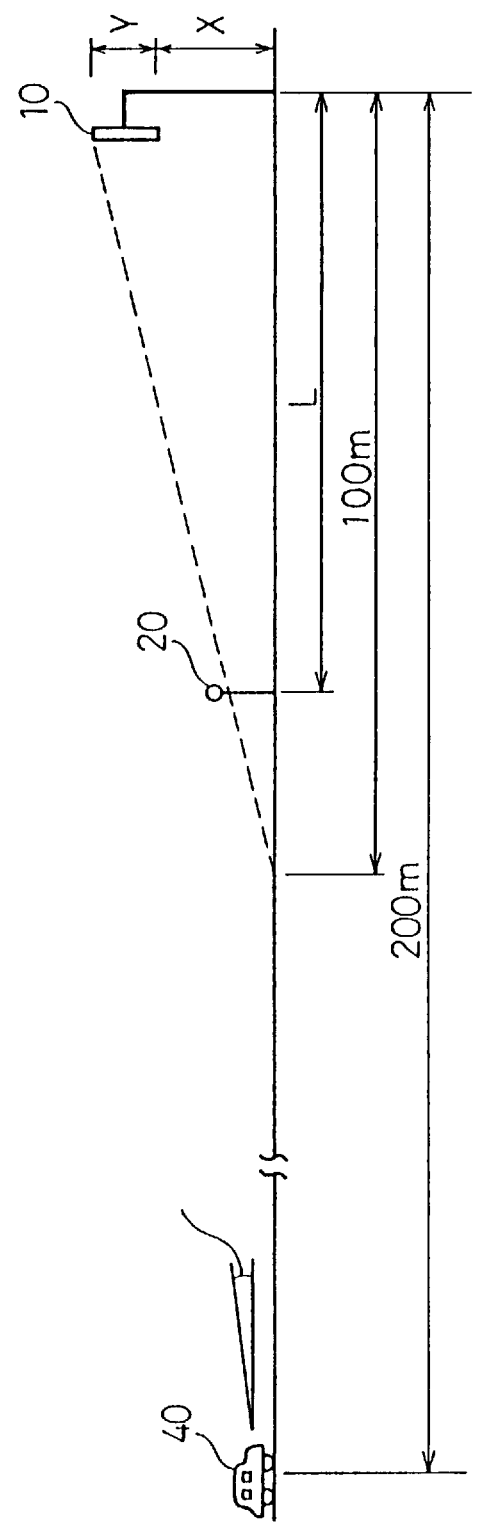
FIG. 2 is a diagram explaining the definition of the height of a pole of the illumination source according to the present invention.

The preferred height H of illumination source 20 will be explained with reference to FIG. 2. As explained above, the height of the bottom of road sign 10 above ground level is X, the height of the sign face itself is Y, the horizontal distance between illumination source 20 and road sign 10 is L, and the height of the pole of illumination source 20 is H. Item 40 is a car traveling on the road approaching the sign. When the sign system is optimized for a distance between car 40 and road sign 10 of 200 meters, a proper value for the height H of the pole is calculated as follows (it being understood that L is typically less than or equal to 100 meters, preferably less than or equal to about 50 meters, more preferably between about 20 and 40 meters):

$$(100-L)X/100 < H < (X+Y)(300+L)/300 \quad \text{(II)}$$

With this height, the driver is presented an optimum viewing angle at which light emitted by the illumination source makes it easier for the driver of car 40 to recognize and read the road sign. At this distance, the driver typically sees the road sign at a narrow elevation angle, e.g., about 0°.

Figure 3:
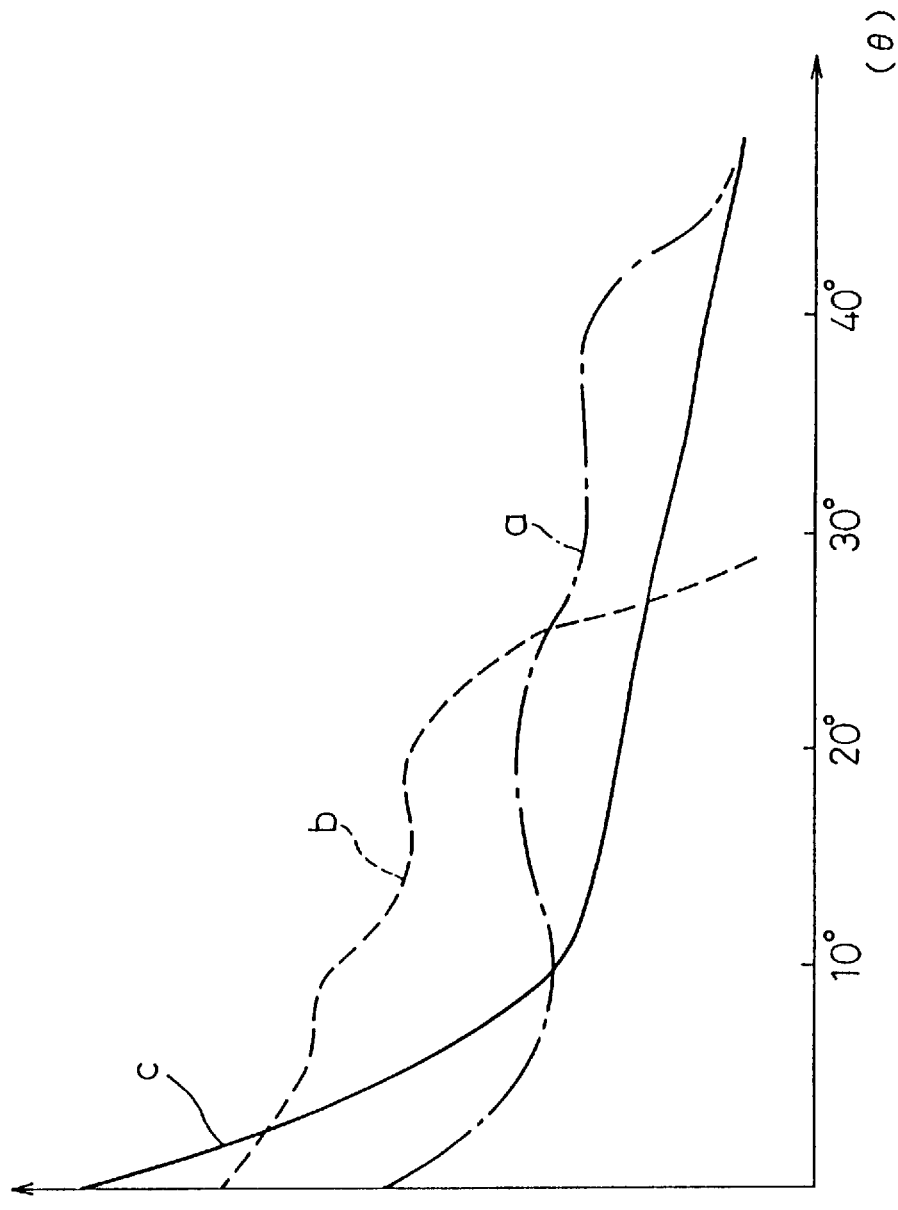
FIG. 3 is a graph showing relationships between observation angles and reflection brightness of two retroreflective sheetings having wide effective observation angles and a retroreflective sheet having a narrow effective observation angle.

Referring to FIG. 3, the curves represent the relative retroreflective brightnesses at varying indicated observation angles of three kinds of retroreflective sheeting. The vertical axis represents the retroreflective brightness and the horizontal axis represents the observation angle. Curve "a" is that of a retroreflective sheet having a wide observation angle response, e.g., to about 40° of so, curve "b" is that of a retroreflective sheet having a wide, but somewhat narrower observation angle response, e.g., to about 25° or so, and curve "c" is that of a retroreflective sheet having relatively narrow observation angle response, e.g., only 2°. The sheetings of curves "a" and "b" are well suited for use in the present invention. The sheeting of "c", however, is optimized for very narrow observation angles (where its retroreflective performance is substantially greater than that of the other two sheetings) and is not well suited for the present invention.

To an observer in an approaching vehicle, the retroreflective brightness from the sheeting of curve "c" is high around observation angles of about 0° to about 2°, but it drops steeply as the observation angle increases. As a result, the visibility of the sheeting suddenly decreases when an observer comes out of the high-brightness observation angles. If the illumination source 20 is arranged adjacent to road sign 10 as shown in FIG. 6, light from the illumination source forms an incident angle in the range of 0° to 60° on the road sign. The road sign made of the conventional sheet reflects this light only diffusely, so light emitted is not reflected so as to make the sign more visible and readable to a driver. In addition, the illumination source of FIG. 6 is positioned with respect to the sign face that it will momentarily block visibility of the sign to passing motorists.

On the other hand, the retroreflective sheeting of curve "a" stably provides reflective brightness for a wide observation angle ranging from 0° to about 40°. As explained before, the illumination angle of the illumination source 20 is preferably restricted to 0° to about 30°. The difference of 10 degrees between the range of 0° to about 30° and the observation angle range of 0° to about 40° can provide a margin of ensured visibility to enhance safety for motorists. The relationships between the observation angles and the reflective brightness are most stabilized in the range of 0° to about 30° for drivers that view the road sign board 10.

The retroreflective sheet of curve b provides good reflective brightness in the observation angle range of 0° to 25°. In practice, this observation angle range is sufficient for drivers to recognize and read the road sign. In addition, road signs with this observation angle range are easy to manufacture at low cost and, therefore, are widely applicable.

The illumination source 20 is preferably installed on shoulder E of the road, so that illumination source 20 let drivers easily recognize and read the road sign with no dead angle, i.e., without blocking visibility of the sign by the motorists. Illumination source 20 installed on shoulder E is easy to inspect and maintain.

Figure 4A:
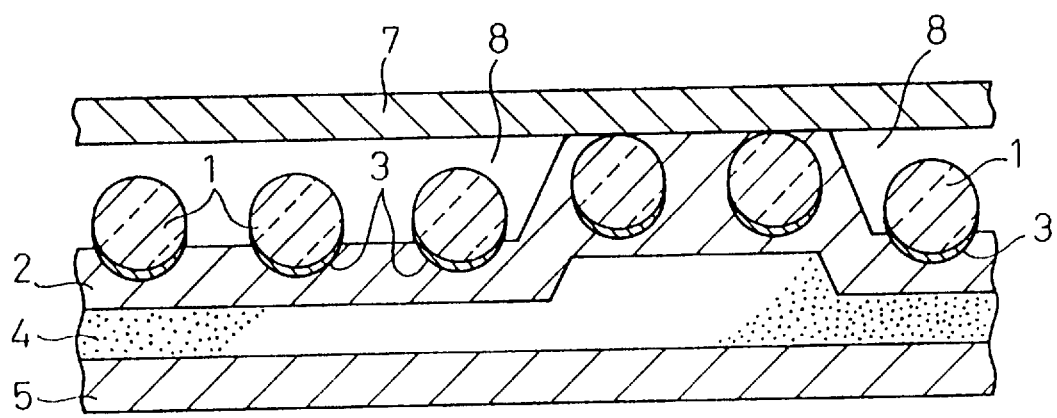
FIGS. 4(A) and 4(B) are cross sectional views of illustrative retroreflective sheetings that can be employed in the present invention.
Figure 4B:
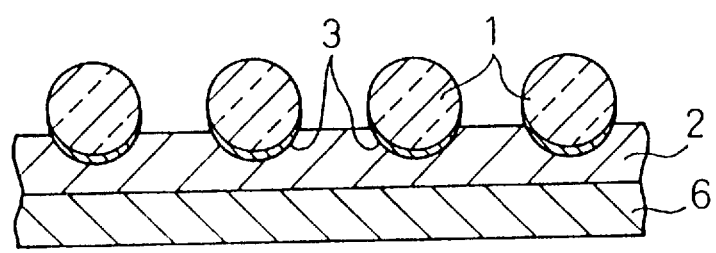

FIGS. 4(A) and 4(B) are sectional views showing examples of retroreflective sheets that can have a wide effective observation angle as desired for a road sign of the present invention. The sheet of FIG. 4(A) is of encapsulated-lens type, and that of FIG. 4(B) is of exposed-lens type. These sheets are disclosed in the aforementioned Japanese Patent Application No. 6-69426 which is incorporated herein in its entirety.

In FIGS. 4(A) and 4(B), numeral 1 is a spherical lens (glass bead), 2 is a binder, 3 is a reflective film (e.g., aluminum), 4 is an adhesive layer, 5 is a temporary release liner, 6 is a support (e.g., sign board), 7 is a transparent cover film, and 8 is an encapsulated cell. These examples employ two kinds of glass beads having different refractive indexes, to provide a brightness of 10 CPL (candela/lux/m$^2$), preferably 20 CPL for an observation angle of 1° to 3°, and at least partly about 1 CPL for an observation angle of 8° to 2°. Consequently, the retroreflective sheet provides the road sign with sufficient visibility. The refractive indexes of the glass beads are not particularly limited but they may be 1.5 to 2.3. If they are below 1.5 or above 2.3, the glass beads may tend to devitrify.

Figure 7:
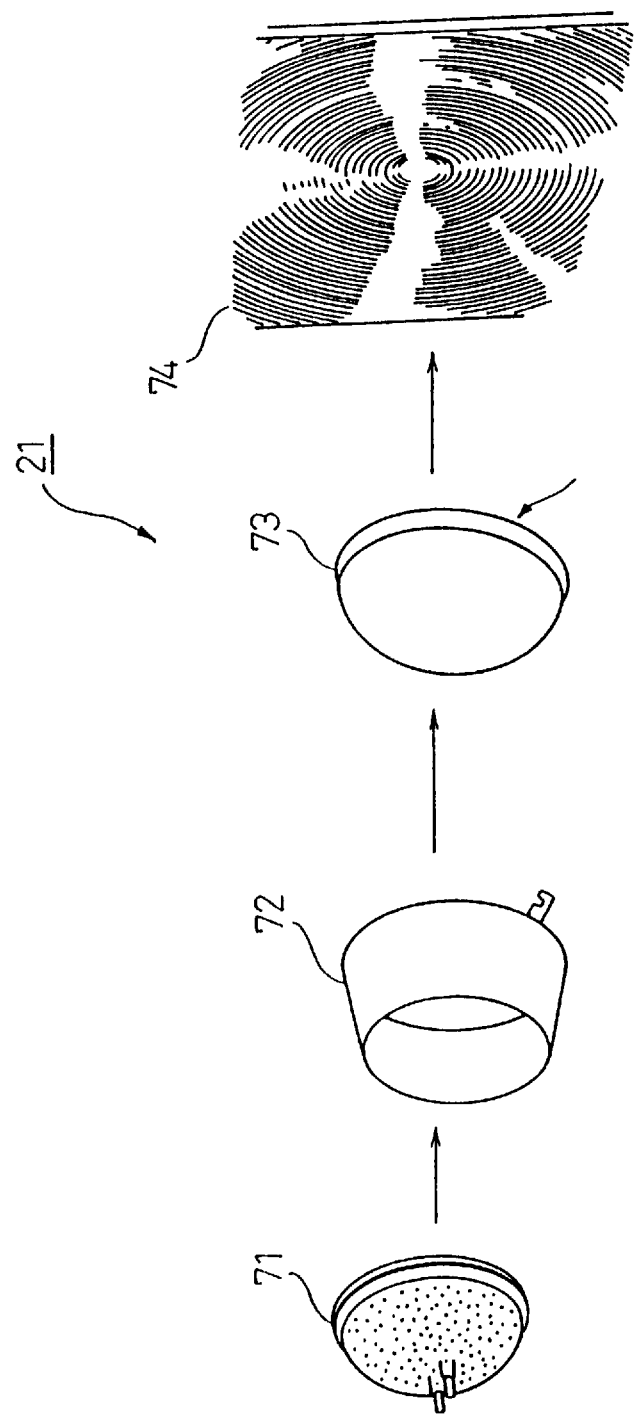
FIG. 7 is an exploded view showing essential parts of a floodlight useful in the present invention.

FIG. 7 is an exploded view showing essential parts of an illustrative floodlight that can be employed in the present invention. The floodlight has lamp 71, reflector 72, limiter 73, and fresnel lens 74. The present invention preferably separately installs the illumination source separated from the road sign by selected distance and position. The illumination source is installed on, for example, the shoulder of a road. In this case, a sufficient measure to block light emission in directions other than to the sign must be taken. Such light can interfere with visibility of drivers in cars running in the opposite lanes, causing traffic trouble. Accordingly, the radiation area of the floodlight 20a (FIG. 1) is preferably limited to the road sign. Limiter 73 is positioned at a focus of fresnel lens 74. The surface of limiter 73 reflects surroundings. While observing the reflected surroundings, one may mask limiter 73 with a tape except a portion that reflects the road sign. The tape prevents limiter 73 from reflecting light. As a result, light from lamp 71 irradiates only the road sign. The portion of the limiter masked with the tape is called a mask.

Although the illumination system and method according to the present invention have been explained with reference to a road sign, the present invention is also applicable to a billboard, boards for bicycle riding paths, for walking paths, and the like. The present invention separately installs the billboard and an external illumination source. Light from the illumination source forms an incident angle (θ) in the range of 0° to about 30°, in practice, 0° to about 15° at any point on the billboard. A display area of the billboard is made of a retroreflective sheet having a wide observation angle. Since the arrangement of the billboard is the same as the road sign, the details thereof will not be explained. In FIG. 1, road sign 10 is replaceable with the billboard with the illumination source of the same arrangement.

EXAMPLES

The invention will be further explained with reference to the follow in g illustrative examples.

The reflection brightness of road signs under various illumination conditions was evaluated. Table 1 shows the resultant measurement of retroreflective brightness under various illumination conditions as described below.

Illumination was provided i n three different conditions. In condition 1 illumination was from road shoulder E with an illumination distance of 20 meters (L of FIG. 1). In condition 2 it was from road shoulder E with an illumination distance of 40 meters (L of FIG. 1). In condition 3 it was from an end of an arm arranged at a lower end of the road sign (FIG. 6).

Reflective brightness was measured at five spots on the road sign face and averaged.

The external illumination source was a streetlight.

Two kinds of retroreflective sheeting were used: (1) A retroreflective sheet having no wide observation angle (corresponding to curve "c" of FIG. 3) and (2) a retroreflective sheet having a wide observation angle (corresponding to curve "b" of FIG. 3).

The results obtained are shown in Table 1 below (brightness is in candelas/lux/m$^2$).

TABLE 1

| | Illumination condition | Reflective sheet | Brightness at Distance from Sign to Vehicle | | | | |
|---|---|---|---|---|---|---|---|
| | | | 50 m | 100 m | 150 m | 200 m | |
| A | Condition 1 | (2) | 63.6 | 128.6 | 132.4 | 142.0 | Present Invention |
| B | Condition 2 | (2) | 37.3 | 71.2 | 75.0 | 78.8 | Present Invention |
| C | Condition 3 | (2) | 25.6 | 33.3 | 42.1 | 43.3 | Comparison 1 |
| D | Condition 3 | (1) | 4.8 | 7.2 | 8.3 | 8.2 | Comparison 2 |

As is apparent in Table 1, the reflective 15 brightness of the measurements A and B with the retroreflective sheet having a wide observation angle is consistently at high levels under different illumination conditions for the distances of 50 to 200 meters. Compared with the measurement D of the prior art of FIG. 6 employing a retroreflective sheet having only a narrow observation angle response, the present invention provides superior performance. Although the measurement C employs the retroreflective sheet having a wide observation angle, lower brightness was observed because the illumination source and sign were not positioned in accordance with the invention.

Table 2 shows maximum angles formed by reflected light with width W of the road sign being 6, 8, and 10 meters and distances between the road sign and the driver being 50, 100, and 200 meters.

TABLE 2

| | 50 m | 100 m | 200 m |
|---|---|---|---|
| 6 m | 6.8° | 3.4° | 1.7° |
| 8 m | 9.1° | 4.6° | 2.3° |
| 10 m | 11.3° | 5.7° | 2.9° |

Glossary

The following definitions are used herein when discussing the geometry of retroreflection:

"Reference Axis" is the line normal to the retroreflective article at the point where light is incident thereto.

"Incidence Axis" is the axis defined by the path of incident light from the light source, e.g., the headlight of a motor vehicle, to the point of incidence on the article.

"Entrance Angle" (sometimes referred to as "Incidence Angle" and also as β) is the angle between the Reference Axis and the Incidence Axis.

"Observation Axis" is the axis defined by the path of retroreflected light from the point of incidence on the article to the observation point, e.g., the eyes of the driver of the motor vehicle.

"Observation Angle" (sometimes referred to as α) is the angle between the Entrance Axis and Observation Axis.

"Entrance Plane" is the plane defined by the Reference Axis and the Incidence Axis.

"Observation Plane" is the plane defined by the Observation Axis and the Incidence Axis.

Various modifications and alterations of this invention will become apparent to those skilled in the art without departing from the scope and spirit of this invention.

What is claimed:

1. A sign illumination system comprising a sign having a sign face and an illumination source, said illumination source emitting light that is incident to said sign face at an incidence angle in the range of about 0° to about 30°, said sign face comprising retroreflective portions.

2. The system of claim 1 wherein said illumination source emits light that is incident to said sign face at an incidence angle of between about 0° to about 30° for substantially all of said sign face.

3. The system of claim 1 wherein said sign is positioned on the shoulder of a road.

4. The system of claim 1 wherein said sign is positioned above the road.

5. The system of claim 1 wherein said illumination source is installed on the shoulder of a road, and said sign is selected from the group of road signs and billboards.

6. The system of claim 1 wherein the illumination source comprises a floodlight, the floodlight having masking means such that it illuminates substantially only said sign face.

7. The system of claim 6 wherein said floodlight is positioned relative to said sign face above ground as follows:

$$(100-L)X/100 < H < (X+Y)(300-L)/300$$

where L is a horizontal distance between said illumination source and said sign face, X is the height of the bottom of said sign face above ground level, Y is the height of the sign face itself, and H is the height of said floodlight above ground level, wherein all distances are in meters and L is less than or equal to 100 meters.

8. The system of claim 1 wherein said incidence angle is in the range of 0° to about 15°.

9. The system of claim 1 wherein said retroreflective portions comprise at least one of the encapsulated-lens type, exposed-lens type, and enclosed-lens type retroreflective material.

10. A method of illuminating a sign having a sign face comprising retroreflective portions, said method comprising the step of positioning an illumination source relative to the sign face to efficiently utilize the wide observation angle while not blocking a view of an observer of any retroreflective point on the sign board, and causing the illumination source to emit light that forms an incident angle in the range of 0° to about 30° at any point on the road sign.

11. The method of claim 10 wherein a distance from said sign face to said illumination source ranges from about 10 to about 100 meters.

\* \* \* \* \*

UNITED STATES PATENT AND TRADEMARK OFFICE
CERTIFICATE OF CORRECTION

PATENT NO. : 5,818,640
DATED : October 6, 1998
INVENTOR(S) : Yoshio Watanabe, Toshitaka Nakajima, Muneo Momozawa and Satoshi Kakishita It is certified that error appears in the above-indentified patent and that said Letters Patent is hereby corrected as shown below:

Col. 1, line 42, "6-9426/94" should read --6-69426/94--.

Col. 4, line 51, "itself." should read --itself,--.

Col. 5, line 12, "(100-L)X/100<H<(X+Y)(300+L)/300" should read --(100-L)X/100<H<(X+Y)(300-L)/300--.

Col. 8, line 21, delete "about" (first occurrence).

Signed and Sealed this

Sixteenth Day of May, 2000

Attest:

Q. TODD DICKINSON

*Attesting Officer*          *Director of Patents and Trademarks*